(12) United States Patent
Hirai

(10) Patent No.: US 10,740,815 B2
(45) Date of Patent: Aug. 11, 2020

(54) SEARCHING DEVICE, SEARCHING METHOD, RECORDING MEDIUM, AND PROGRAM

(71) Applicant: Rakuten, Inc., Tokyo (JP)

(72) Inventor: Yoshihiro Hirai, Tokyo (JP)

(73) Assignee: Rakuten, Inc., Tokyo (JP)

( * ) Notice: Subject to any disclaimer, the term of this patent is extended or adjusted under 35 U.S.C. 154(b) by 481 days.

(21) Appl. No.: 15/110,790

(22) PCT Filed: Jan. 28, 2014

(86) PCT No.: PCT/JP2014/051786
§ 371 (c)(1),
(2) Date: Jul. 11, 2016

(87) PCT Pub. No.: WO2015/114731
PCT Pub. Date: Aug. 6, 2015

(65) Prior Publication Data
US 2016/0335691 A1    Nov. 17, 2016

(51) Int. Cl.
*G06Q 30/00* (2012.01)
*G06Q 30/06* (2012.01)
(Continued)

(52) U.S. Cl.
CPC ... *G06Q 30/0623* (2013.01); *G06F 16/24539* (2019.01); *G06F 16/24578* (2019.01)

(58) Field of Classification Search
CPC ............. G06Q 30/0623; G06Q 30/06–08
(Continued)

(56) References Cited

U.S. PATENT DOCUMENTS 8,458,214 B1 *  6/2013  Wilson .............. G06F 17/30312
                                                                707/777
8,606,652 B2 * 12/2013  Gonsalves ......... G06Q 30/0643
                                                                705/26.1
(Continued)

FOREIGN PATENT DOCUMENTS

JP        2011-175635 A      9/2011

OTHER PUBLICATIONS

International Search Report for PCT/JP2014/051786 dated Mar. 18, 2014 [PCT/ISA/210].
(Continued)

*Primary Examiner* — Ethan D Civan
(74) *Attorney, Agent, or Firm* — Sughrue Mion, PLLC

(57) ABSTRACT

An identifier (232) identifies an alternative product to an attended product getting attention from a user. A searcher (231) searches, when a search condition is given, a group of products satisfying the search condition. A first generator (233) generates a first search condition expected to obtain a search result containing the attended product and the alternative product. A verifier (234) verifies, based on an obtained first search result by the searcher (231) that has searched under the generated first condition, whether or not the first search condition is proper. A second generator (235) generates a second search condition that is the first search condition verified as proper and with an added or replaced condition of a price range that is different from a price range of the attended product. A presenter (240) presents an obtained second search result to the user by the searcher (231) that has searched under the generated second condition.

13 Claims, 9 Drawing Sheets

(51) Int. Cl.
*G06F 16/2453* (2019.01)
*G06F 16/2457* (2019.01)

(58) Field of Classification Search
USPC .................................. 705/26.61, 26.1–27.2
See application file for complete search history.

(56) References Cited

U.S. PATENT DOCUMENTS

| | | | | |
|---|---|---|---|---|
| 9,311,650 | B2* | 4/2016 | Li | G06F 17/30867 |
| 2006/0282304 | A1* | 12/2006 | Bedard | G06F 17/30867 |
| | | | | 705/7.33 |
| 2007/0130015 | A1* | 6/2007 | Starr | G06Q 30/02 |
| | | | | 705/14.46 |
| 2008/0109306 | A1* | 5/2008 | Maigret | G06F 21/10 |
| | | | | 705/14.46 |
| 2008/0155588 | A1* | 6/2008 | Roberts | G06Q 30/00 |
| | | | | 725/34 |
| 2010/0153831 | A1* | 6/2010 | Beaton | G06Q 30/02 |
| | | | | 715/201 |
| 2012/0143861 | A1* | 6/2012 | Sethi | G06F 17/30536 |
| | | | | 707/731 |
| 2012/0310769 | A1* | 12/2012 | Lawrence | G06Q 30/02 |
| | | | | 705/26.7 |
| 2013/0262531 | A1* | 10/2013 | Wilson | G06F 17/30312 |
| | | | | 707/812 |
| 2014/0236942 | A1* | 8/2014 | Li | G06F 17/30867 |
| | | | | 707/735 |
| 2014/0297630 | A1* | 10/2014 | Cao | G06F 17/30864 |
| | | | | 707/725 |
| 2015/0310522 | A1* | 10/2015 | Kashima | G06Q 30/06 |
| | | | | 705/26.61 |
| 2017/0123616 | A1* | 5/2017 | Battles | G06F 3/0484 |

OTHER PUBLICATIONS

Written Opinion for PCT/JP2014/051786 dated Mar. 18, 2014 [PCT/ISA/237].

* cited by examiner

| PRODUCT ID | CATEGORY NAME | PRODUCT NAME | PRODUCT DESCRIPTION | SALES PRICE | ... |
|---|---|---|---|---|---|
| ABC-D123 | LIQUID CRYSTAL TELEVISION | COMPANY A, 32V TYPE ABC | 32V TYPE LIQUID CRYSTAL TELEVISION COMPATIBLE WITH BS 110-DEGREE CS DIGITAL HIGH-VISION ... | 37,800 | ... |
| BCD-E234 | LIQUID CRYSTAL TELEVISION | COMPANY B, 39V TYPE BCD | 39V TYPE LIQUID CRYSTAL TELEVISION COMPATIBLE WITH BS 110-DEGREE CS COMPATIBLE WITH 3D ... | 49,780 | ... |
| CDE-F345 | PLASMA TELEVISION | COMPANY C, 55V TYPE CDE | 55V TYPE PLASMA TELEVISION COMPATIBLE WITH BS 110-DEGREE CS USB HARD DISK RECORDING ... | 183,800 | ... |
| DEF-G456 | LIQUID CRYSTAL TELEVISION | COMPANY D, 24V TYPE DEF | 24V TYPE LIQUID CRYSTAL TELEVISION COMPATIBLE WITH BS 110-DEGREE CS DIGITAL HIGH-VISION ... | 21,800 | ... |
| EFG-H567 | LIQUID CRYSTAL TELEVISION | COMPANY E, 42V TYPE EFG | 42V TYPE LIQUID CRYSTAL TELEVISION COMPATIBLE WITH BS 110-DEGREE CS USB HARD DISK RECORDING ... | 73,800 | ... |
| FGH-I678 | LIQUID CRYSTAL TELEVISION | COMPANY F, 32V TYPE FGH | 32V TYPE LIQUID CRYSTAL TELEVISION COMPATIBLE WITH BS 110-DEGREE CS USB HARD DISK RECORDING ... | 38,500 | ... |
| .. | .. | .. | .. | .. | .. |

Fig.4

| SALES PRODUCT ID | USER ID | SALES DATE | SALES PRICE | REFERENCE PRODUCT ID | ... |
|---|---|---|---|---|---|
| FGH-I678 | U12345 | DECEMBER 23, 2013 | 38,500 | ABC-D123 | ... |
| XXX-X111 | U23456 | DECEMBER 23, 2013 | 77,000 | EFG-H567 | ... |
| DEF-G456 | U34567 | DECEMBER 23, 2013 | 21,800 | HHH-H222 | ... |
| ABC-D123 | U45678 | DECEMBER 24, 2013 | 37,800 | FGH-I678 | ... |
| JJJ-J333 | U56789 | DECEMBER 24, 2013 | 51,000 | BCD-E234 | ... |
| EFG-H567 | U67890 | DECEMBER 24, 2013 | 73,800 | YYY-Y444 | ... |
| ... | ... | ... | ... | ... | ... |

Fig.5

| LOWER GRADE PRODUCTS | | 503 |
|---|---|---|
| COMPANY D, 24V TYPE DEF | 21,700 YEN- | |
| COMPANY P, 24V TYPE PQR | 22,100 YEN- | |

Fig.8

| HIGHER GRADE PRODUCT | | 504 |
|---|---|---|
| COMPANY B, 39V TYPE BCD | 49,500 YEN- | |
| COMPANY J, 39V TYPE JKL | 50,900 YEN- | |
| LOWER GRADE PRODUCTS | | |
| COMPANY D, 24V TYPE DEF | 21,700 YEN- | |
| COMPANY P, 24V TYPE PQR | 22,100 YEN- | |

Fig.9

SEARCHING DEVICE, SEARCHING METHOD, RECORDING MEDIUM, AND PROGRAM

CROSS REFERENCE TO RELATED APPLICATIONS

This application is a National Stage of International Application No. PCT/JP2014/051786 filed Jan. 28, 2014, the contents of all of which are incorporated herein by reference in their entirety.

TECHNICAL FIELD

The present disclosure relates to a searching device, a searching method, a non-transitory recording medium, and a program.

BACKGROUND ART

In recent years, sales sites for conducting electronic commerce over the Internet are becoming popular. For example, a sales site (a shopping mall site) composed of a collection of many stores (virtual stores) are attracting many users since such sales site not only provides products of broad categories (genres) as a whole, but often provides price competition among the stores.

In such a sales site, respective products (products in each store) are managed and classified into hierarchical categories, and a list of products is displayed on a user terminal that has accessed the sales site. In addition, the sales site is also capable of displaying a list of products that is obtained based on a search condition (for example, a keyword) entered by a user in a predetermined order (for example, in order of popularity or sales price).

Patent Literature 1 discloses an example conventional technology for such sales site which is a server device to guarantee the credibility of a sales price that is displayed on a webpage.

CITATION LIST

Patent Literature

Patent Literature 1: Unexamined Japanese Patent Application Kokai Publication No. 2011-175635

SUMMARY OF INVENTION

Technical Problem

The user who utilizes the aforementioned conventional sales site decides, in general, a product based on a comparison among several products during a process for purchasing the product. That is, the user does not directly purchase a product (an attended product) that has caught by the eye of the user on a product list display screen or the like, but quite often decides a product to eventually purchase based on, for example, a comparison with products in other grades. More specifically, the user who desires to purchase a higher quality product searches higher grade products than the attended product, and compares the search results with the attended product. Conversely, the user who desires to purchase a lower quality product searches lower grade products than the attended product, and compares the search results with the attended product.

However, entering of an appropriate search condition is necessary in order to search products with those other grades. This takes a time for the user, and a certain skill is necessary for the user. Thus, in reality, many users repeat multiple entries of the search condition, and then products with other grades can be eventually searched.

Therefore, a technology that enables an appropriate search for a product having a different grade from that of the attended product has been desired.

The present disclosure has been made in view of the aforementioned circumstances, and an objective of the present disclosure is to provide a searching device, a searching method, a non-transitory recording medium, and a program that enable an appropriate search for a product having a different grade from that of an attended product.

Solution to Problem

In accordance with a first aspect of the present disclosure, there is provided a searching device including:

an identifier that identifies an alternative product to an attended product getting attention from a user;

a searcher that searches, when a search condition is given, a group of products satisfying the search condition;

a first generator that generates a first search condition expected to obtain a search result containing the attended product and the alternative product;

a verifier that verifies, based on a first search result that is obtained by the searcher that has performed searching under the generated first condition, whether or not the first search condition is proper;

a second generator that generates a second search condition that is the first search condition verified as proper and with an added or replaced condition of a price range different from a price range of the attended product; and a presenter that presents, to the user, a second search result that is obtained by the searcher that has performed searching under the generated second condition.

In the searching device according to the aforementioned aspect, the generated first search condition is verified as proper when an appearance rank of the attended product and an appearance rank of the alternative product in the obtained first search result are higher than a predetermined threshold rank.

In the searching device according to the aforementioned aspect, the identifier identifies the alternative product to the attended product in accordance with sales performance information containing a sales process and a sales price.

In the searching device according to the aforementioned aspect, the first generator generates the first search condition containing a category name and a keyword that are common to the attended product and the alternative product.

In the searching device according to the aforementioned aspect, the second generator obtains a price range of the attended product based on a sales price of the attended product in sales performance information excluding a discount price, the sales performance information being information on a sales performance of the attended product from a present time to a predetermined past time, and generates the second search condition that is the first search condition with the added or replaced condition of the price range that is higher or lower than the determined price range by a predetermined percentage.

In accordance with a second aspect of the present disclosure, there is provided a searching method including:

an identifying step of identifying an alternative product to an attended product that is getting attention from a user;

a searching step of searching, when a search condition is given, a group of products that satisfies the searching condition;

a first generating step of generating a first search condition expected to obtain a search result containing the attended product and the alternative product;

a verifying step of verifying, based on a first search result that is obtained through searching under the generated first search condition in the searching step, whether or not the first search condition is proper;

a second generating step of generating a second search condition that is the first search condition verified as proper and with an added or replaced condition of a price range different from a price range of the attended product; and a presenting step of presenting, to the user, a second search result that is obtained through searching under the generated second search condition in the searching step.

In accordance with a third aspect of the present disclosure, there is provided a non-transitory recording medium having stored therein a program for causing a computer to function as:

an identifier that identifies an alternative product to an attended product getting attention from a user;

a searcher that searches, when a search condition is given, a group of products satisfying the search condition;

a first generator that generates a first search condition expected to obtain a search result containing the attended product and the alternative product;

a verifier that verifies, based on a first search result that is obtained by the searcher that has performed searching under the generated first condition, whether or not the first search condition is proper;

a second generator that generates a second search condition that is the first search condition verified as proper and with an added or replaced condition of a price range different from a price range of the attended product; and a presenter that presents, to the user, a second search result that is obtained by the searcher that has performed searching under the generated second condition.

The aforementioned recording medium may be a non-transitory recording medium, and can be distributed and sold separately from the computer. Note that the non-transitory recording medium is a tangible recording medium. The non-transitory recording medium is, for example, a compact disc, a flexible disk, a hard disk, a magneto-optical disk, a digital video disk, a magnetic tape, or a semiconductor memory. In addition, a transitory recording medium is a transmission medium (a carrier signal) itself. The transitory recording medium is, for example, an electrical signal, an optical signal, or an electromagnetic wave. Note that a temporary memory area is an area for temporarily storing data or a program, and is a volatile memory like a random access memory (RAM).

In accordance with a fourth aspect of the present disclosure, there is provided a program that causes a computer to function as:

an identifier that identifies an alternative product to an attended product getting attention from a user;

a searcher that searches, when a search condition is given, a group of products satisfying the search condition;

a first generator that generates a first search condition expected to obtain a search result containing the attended product and the alternative product;

a verifier that verifies, based on a first search result that is obtained by the searcher that has performed searching under the generated first condition, whether or not the first search condition is proper;

a second generator that generates a second search condition that is the first search condition verified as proper and with an added or replaced condition of a price range different from a price range of the attended product; and a presenter that presents, to the user, a second search result that is obtained by the searcher that has performed searching under the generated second condition.

The aforementioned program can be distributed and sold over a computer communication network separately from a computer on which the program is executed.

Advantageous Effects of Invention

According to the present disclosure, an appropriate search for a product having a different grade from that of an attended product is enabled.

BRIEF DESCRIPTION OF DRAWINGS

FIG. 4 is an exemplary diagram for explaining example product information;

FIG. 5 is an exemplary diagram for explaining example sales performance information;

FIG. 8 is an exemplary diagram illustrating an example of another informative product screen;

FIG. 9 is an exemplary diagram illustrating an example of another informative product screen.

DESCRIPTION OF EMBODIMENTS

An embodiment of the present disclosure will be described below. In this embodiment of the present disclosure, the explanation will be given of an example sales site (a shopping mall site) composed of a collection of many stores (virtual stores), but the present disclosure is also applicable as needed to a sales site that is run by a single store (a business entity).

In addition, it should be noted that the following embodiment is meant only to be illustrative and is not intended to limit the scope of the present disclosure. Accordingly, it will be apparent to those skilled in the art that various equivalent and alternative embodiments, in whole or in part, are possible, and the present disclosure also covers all of these embodiments.

(Overall Structure)

Figure 1:
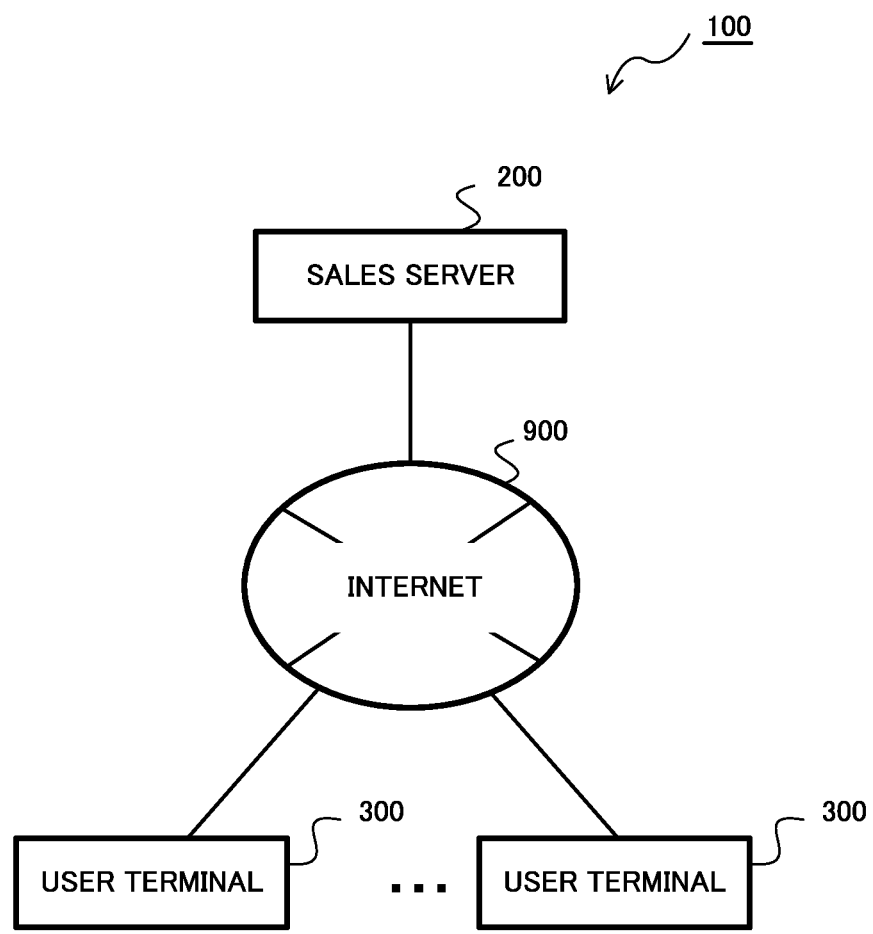
FIG. 1 is a block diagram illustrating an example overall structure of a sales system according to an embodiment.

As illustrated in FIG. 1, a sales system 100 according to the embodiment of the present disclosure is constructed by a sales server 200 and each user terminal 300 connected with each other over Internet 900. Although the figures provided herein illustrate simplified forms, it is presumed that a large number of the user terminals 300 are present in accordance with the users who utilize the user terminals.

The sales server 200 includes, for example, a server computer which realizes the searching device of the present disclosure. This sales server 200 provides information on a product to the user terminal 300, and sells a product desired by the user.

For example, the sales server 200 sells products of many stores (virtual stores), and manages and classifies the respective products (products in each store) into hierarchical categories. The sales server 200 displays a list of products and the like on the user terminal 300 that has accessed the sales server. For example, the sales server 200 displays a list of products (a group of products) belonging to a category specified by the user in a predetermined order (for example, in the order of popularity or sales price), and provides the list of products to the user terminal 300. In addition, the sales server 200 displays, in a predetermined order, a list of the products that is obtained based on a search condition (for example, a keyword) entered by the user, and provides the list of products to the user terminal 300.

Furthermore, the sales server 200 appropriately searches a product having a different grade from that of an attended product getting attention from the user among the products in the displayed list, and provides the searched products to the user terminal 300.

The user terminal 300 includes, for example, a personal computer, or a smartphone, and accesses the sales server 200 over the Internet 900, obtains information on a product, accepts a user operation, and purchases a desired product from the sales server 200.

(General Structure of Information Processing Device)

Next, a typical information processing device 400 that realizes the sales server 200 and the user terminal 300 according to the embodiment of the present disclosure will be described.

Figure 2:
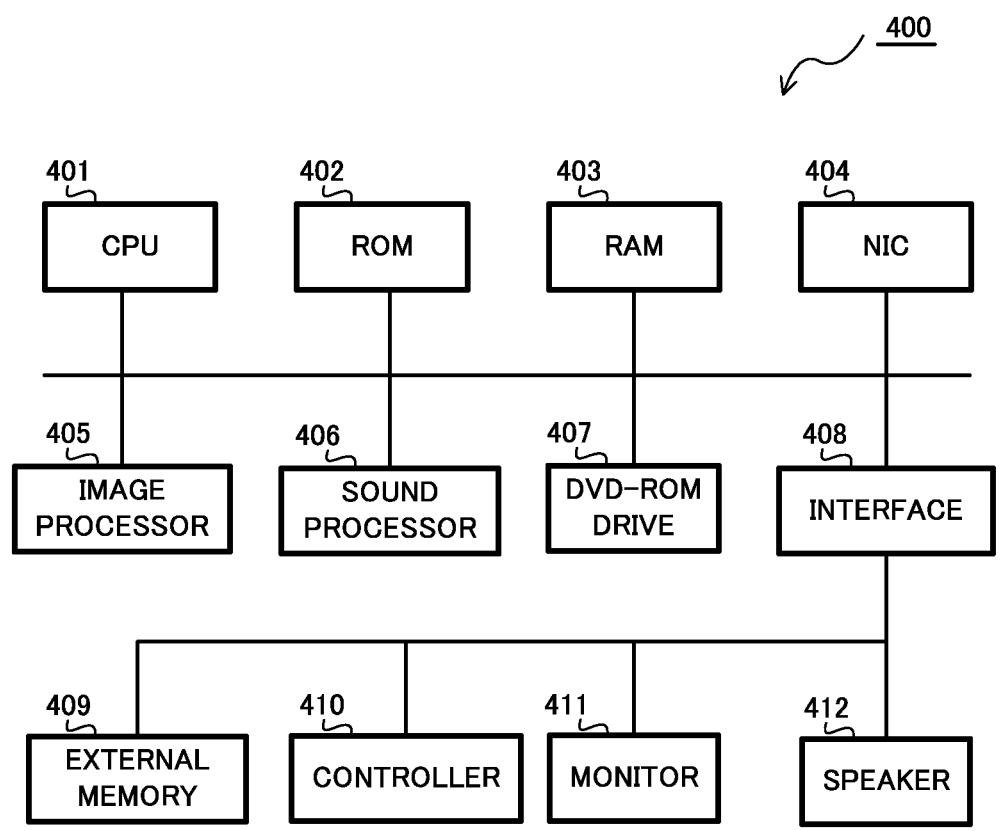
FIG. 2 is a block diagram illustrating an example general structure of a typical information processing device that realizes a sales server and a user terminal.

As illustrated in FIG. 2, the information processing device 400 includes a Central Processing Unit (CPU) 401, a Read Only Memory (ROM) 402, a Random Access Memory (RAM) 403, a Network Interface Card (NIC) 404, an image processor 405, a sound processor 406, a Digital Versatile Disc ROM (DVD-ROM) drive 407, an interface 408, an external memory 409, a controller 410, a monitor 411, and a speaker 412.

The CPU 401 that controls the whole operation of the information processing device 400, is connected with each structural element, and exchanges control signals and data therewith.

An Initial Program Loader (IPL) that is executed immediately after a power-on is recorded in the ROM 402, and upon execution of the IPL, a predetermined program is read in the RAM 403, and the CPU 401 starts executing this program. In addition, the ROM 402 stores programs and various data for an operating system which are necessary for controlling the whole operation of the information processing device 400.

The RAM 403 is to temporarily store data and programs, and stores programs and data read from a DVD-ROM, and stores data and the like that are necessary for communication.

The NIC 404 is to connect the information processing device 400 with a computer communication network like the Internet, and includes, for example, a device that is compatible with 10BASE-T/100BASE-T specification utilized when establishing a Local Area Network (LAN), an analog modem to be connected with the Internet through telephone lines, an Integrated Services Digital Network (ISDN) modem, an Asymmetric Digital Subscriber Line (ADSL) modem, or a cable modem to be connected with the Internet through cable television lines, and, an interface (unillustrated) or the like that mediates such a device with the CPU 401.

Subsequent to a processing on data that is read from the DVD-ROM or the like performed by the CPU 401 or by an image operation processor (unillustrated) of the image processor 405, the image processor 405 records the processed data in a frame memory (unillustrated) of the image processor 405. Image information recorded in the frame memory is converted to a video signal at a predetermined synchronization timing, and the video signal is output to the monitor 411. Thus, various webpages can be displayed.

The sound processor 406 converts sound data that is read from the DVD-ROM or the like to an analog sound signal, and this analog signal is output from the speaker 412 that is connected with the sound processor. In addition, under the control of the CPU 401, sounds to be generated during an ongoing process performed by the information processing device 400 are generated, and sounds corresponding to these generated sounds are output from the speaker 412.

The DVD-ROM that is loaded in the DVD-ROM drive 407 stores, for example, a program for realizing the sales server 200 of this embodiment. Under the control of the CPU 401, the DVD-ROM drive 407 performs a reading process on the DVD-ROM that is loaded in the DVD-ROM drive, and reads necessary programs and data, and, these programs and data are temporarily stored in the RAM 403 or the like.

The external memory 409, the controller 410, the monitor 411, and the speaker 412 are detachably connected with the interface 408.

The external memory 409 rewritably stores data and the like relevant to user's personal information.

The controller 410 accepts an input operation that is performed at the time of various setups for the information processing device 400. The user of the information processing device 400 can record those pieces of data in the external memory 409 as needed by entering an instruction through the controller 410.

The monitor 411 presents, to the user of the information processing device 400, data that is output by the image processor 405.

The speaker 412 presents, to the user of the information processing device 400, sound data that is output by the sound processor 406.

In addition, the information processing device 400 may accomplish the same functions as those of the ROM 402, the RAM 403, the external memory 409, the DVD-ROM loaded in the DVD-ROM drive 407, and the like using an external large-capacity storage device like a hard disk.

Next, a structure and the like of the sales server 200 realized by the aforementioned information processing device 400 will be described with reference to FIG. 3 to FIG. 9. When the information processing device 400 is turned on, and an access from, for example, the user terminal 300 is accepted, each program for achieving the functions of the sales server 200 of this embodiment is executed, and thus the sales server 200 of this embodiment is realized.

Note that, the user terminal 300 is also realized by the information processing device 400 in the same manner, thus the explanation for the relevant structure is omitted, but the sales server 200 that is the main feature of this embodiment will be described below.

(General Structure of Sales Server)

Figure 3:
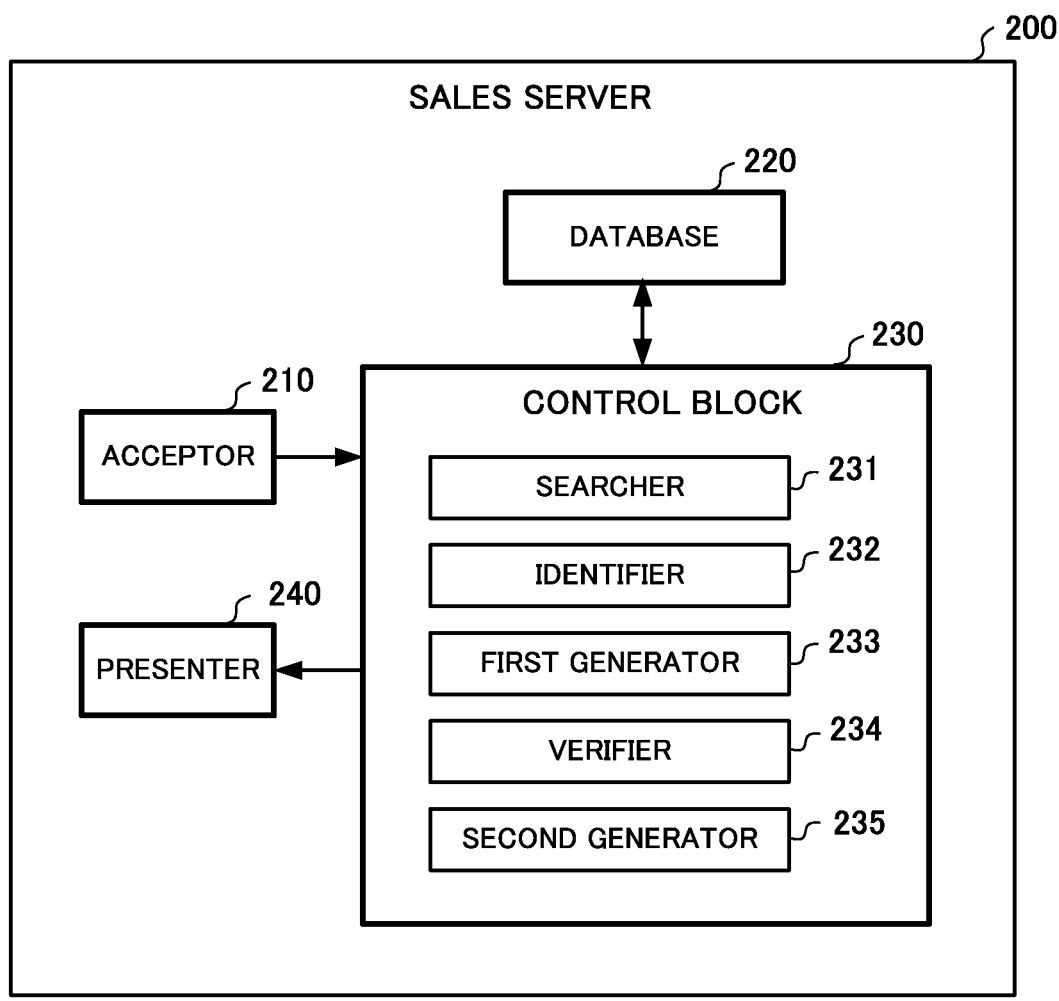
FIG. 3 is a block diagram illustrating an example general structure of a sales server according to the embodiment.

FIG. 3 is a block diagram illustrating an example general structure of the sales server 200 according to this embodiment. As is illustrated in the figure, the sales server 200 includes an acceptor 210, a database 220, a control block 230, and a presenter 240.

The acceptor 210 accepts various information transmitted from each user terminal 300 through the Internet 900.

For example, the acceptor 210 accepts, from the user terminal 300, a transition instruction to the product list display screen, and various operation instructions (for example, a mouse moving operation and a click operation to be discussed later) in the list display screen. In addition, the acceptor 210 accepts, from the user terminal 300, information that needs to be registered prior to the purchase of a product, such as user information, payment account information or credit information.

The aforementioned NIC 404 and the like can function as such acceptor 210.

The database 220 stores various information on products, and various information on the user.

For example, the database 220 stores product information 221 as illustrated in FIG. 4. This example product information 221 contains a product ID 221a, a category name 221b, a product name 221c, a product description 221d, and a sales price 221e.

Although FIG. 4 illustrates simplified product information 221, it is presumed that, in practice, information on all products of all stores (virtual stores) is contained. Note that the same products often have the different sales prices and the like depending on the respective stores.

In addition, the database 220 stores sales performance information 222 as illustrated in FIG. 5. This sales performance information 222 is the information on a product that was actually sold (purchased by the user).

Example sales performance information 222 contains a sales product ID 222a, a user ID 222b, a sales date 222c, a sales price 222d, and a reference product ID 222e.

This reference product ID 222e indicates other products that were referred when the product was purchased during a process for selling the product. For example, when further detail information on a product B is reviewed by the user who has made a purchase during a process for selling a product A (for example, within a predetermined time or within the same session), an ID of the product B is then stored as the reference product ID 222e. Note that the reference product ID 222e in FIG. 5 indicates a single ID, but when further detail information on multiple products are reviewed by the user during the sales process, each product ID is then stored.

In addition, although FIG. 5 illustrates simplified sales performance information 222, it is presumed that, in practice, information on the store and the like where the purchase was made is also contained.

In addition, the database 220 stores the user information (for example, a user ID, a password and the like), the payment account information, the credit information, and the like which are entered through the acceptor 210.

The aforementioned RAM 403, the external memory 409, and the like can function as such database 220.

Returning to FIG. 3, the control block 230 controls the whole sales server 200. This control block 230 includes a searcher 231, an identifier 232, a first generator 233, a verifier 234, and a second generator 235, and assists the purchase of a product by the user.

When a search condition like a keyword is given, the searcher 231 searches, in the database 220, a group of products satisfying the given search condition.

When, for example, the search conditions including various keywords (a category name, a product name, a manufacturer name, a specification, and the like), and a sales price range are given, the aforementioned product information 221 in the database 220 as illustrated in FIG. 4 is searched, and the group of products that satisfies the search conditions is obtained.

The identifier 232 identifies an alternative product to the attended product that is getting attention from the user. That is, the identifier 232 determines whether or not there is the attended product, and if there is the attended product, identifies the alternative product to the attended product.

Figure 6:
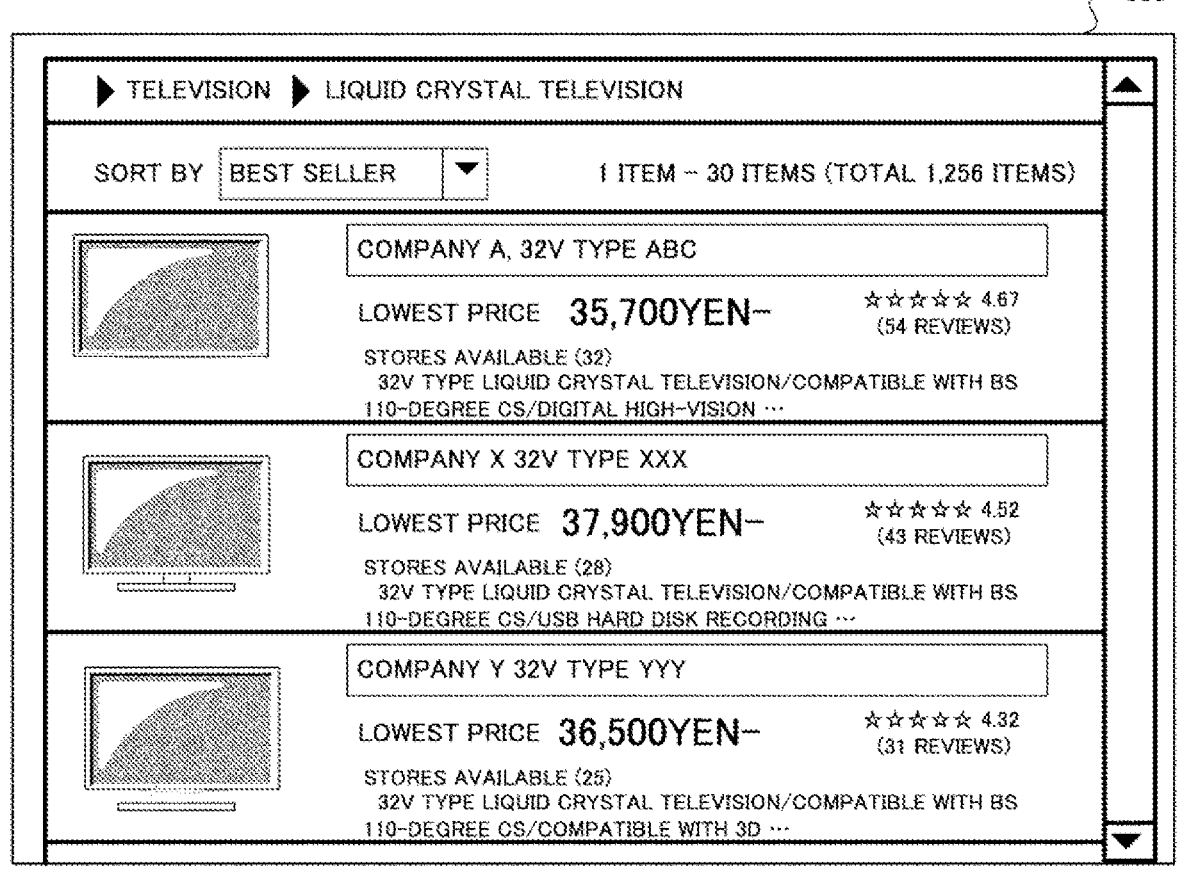
FIG. 6 is an exemplary diagram illustrating an example product list display screen.

For example, the identifier 232 determines whether or not there is the attended product based on a position of a mouse cursor in the user terminal 300 (for example, on the product list display screen). The example product list display screen 500 (the product list display screen 500 presented to the user terminal 300 by the presenter 240 to be discussed later) as illustrated in FIG. 6 will now be explained in more details. When the position of a mouse cursor in accordance with the user's mouse operation accepted by the acceptor 210 overlaps any one of the pieces of product information (within a display region of those pieces of information), the identifier 232 determines that this product is the attended product.

In addition, the identifier 232 identifies the alternative product to the attended product in accordance with the sales performance information containing the sales process and the sales price.

For example, the identifier 232 extracts, from the aforementioned sales performance information 222 illustrated in FIG. 5, a product having either the sales product ID 222a or the reference product ID 222e that matches with the product ID (the aforementioned product ID 221a in FIG. 4) of the attended product. That is, the identifier extracts the products that have been referred during the sales process of the attended product, and conversely, extracts the products referred for the attended product during the sales process. In addition, the identifier 232 identifies, among the extracted products, the product (for example, the product having a price difference that is within a predetermined range) having the sales price that is similar to the sales price of the attended product to be the alternative product to the attended product.

More specifically, when the attended product is "ABC-D123", the identifier 232 extracts, from the sales performance information 222 in FIG. 5, a record 222L1 containing the sales product ID 222a of "FGH-I678" and the reference product ID 222e of "ABC-D123", and extracts a record 222L2 containing the sales product ID 222a of "ABC-D123" and the reference product ID 222e of "FGH-I678". In addition, because the sales price of the "FGH-I678" is similar to the sales price of the attended product, the identifier 232 identifies that the "FGH-I678" is the alternative product to the attended product "ABC-D123".

That is, the identifier 232 identifies the alternative product to the attended product based on the sales process and the sales price. Note that the number of alternative products to be identified varies depending on respective attended product. In addition, when the number of alternative products exceeds a certain number, the identifier 232 may identify, based on a predetermined cost calculation, a certain number of the alternative products in the order of the stronger correlation to the attended product.

The first generator 233 generates a first search condition expected to obtain a search result that contains the attended product and the alternative products. That is, when the searcher 231 searches the aforementioned product information 221 in FIG. 4, the first generator generates the first search condition that can possibly obtain the search result containing the attended product and the alternative products.

For example, the first generator 233 generates the first search condition using a common category name between the attended product and the alternative products, a common keyword, and a term that commonly appears in the product description. Note that when the attended product is obtained based on a previous search condition, the first generator 233 generates the first search condition that further contains the previous search condition.

The verifier 234 verifies the properness of the first search condition that is generated by the first generator 233.

For example, the verifier 234 causes the searcher 231 to search the aforementioned product information 221 in FIG. 4 under the generated first search condition, and verifies, based on the actually obtained first search result, whether or not the first search condition is proper. More specifically, when appearing ranks of the attended product and the alternative product included in the obtained first search result are higher than a predetermined threshold rank, the verifier 234 then verifies that the generated first search condition is proper.

Note that this verification scheme of the first search condition performed by the verifier 234 is merely an example, and the verifier may determine whether or not the first search condition is proper through other verification schemes. For example, when the search condition is constructed by a combination of multiple sub-conditions, the properness of the first search condition may be verified based on whether or not the average rank (the median rank) of the attended product and that of the alternative product are as high as possible, and the combination can accomplish the ranking as narrow as possible.

The second generator 235 generates a second search condition which is the first search condition that has been verified as proper and with an added or replaced condition of the price range different from that of the attended product. That is, the second generator 235 generates the second search condition to search a group of informative products having a different grade from that of the attended product.

For example, the second generator 235 searches, in the aforementioned sales performance information 222 in FIG. 5, a sales performance for the attended product under a condition containing recent sales performance (for example, the sales date 222*c* from the present time to the predetermined past time), and excluding the sales performance for a discount price (for example, excluding the sales performance that is out of a standard deviation measured around a mean value), and counts the sales price 222*d* of the obtained records to determine the price range of the attended product. Note that the purpose of counting the recent sales price 222*d* is to exclude old products (products of previous model and the like).

In addition, the second generator 235 generates the second search condition which is the first search condition with an added or replaced condition of the price range that is higher or lower than the determined price range of the attended product by a predetermined percentage. That is, when searching the group of informative products having a higher grade than that of the attended product, the second generator 235 generates the second search condition which is the first condition with the further added (or replaced) condition of the price range that is higher than the determined price range of the attended product by the predetermined percentage. Conversely, when searching the group of informative products having a lower grade than that of the attended product, the second generator 235 generates the second search condition which is the first search condition with the further added condition of the price range that is lower than the determined price range of the attended product by the predetermined percentage.

In addition, when the product is purchased by the user, the control block 230 updates the aforementioned sales performance information 222 as illustrated in FIG. 5. Still further, when the sales price of the available product and the like is changed by a store, the control block 230 updates the aforementioned sales information 221 as illustrated in FIG. 4.

The aforementioned CPU 401 and the like can function as the control block 230 employing the aforementioned structures.

The presenter 240 presents various information to the user terminal 300 through the Internet 900.

Figure 7:
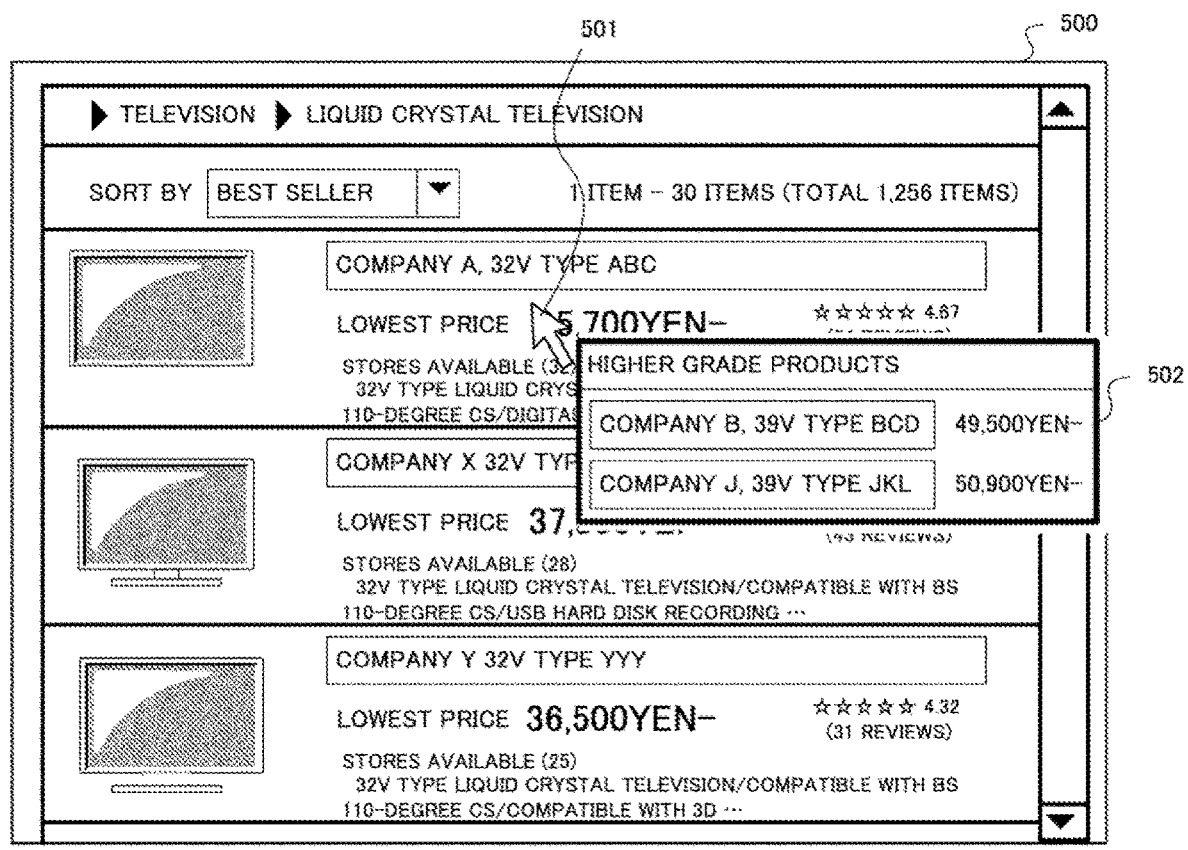
FIG. 7 is an exemplary diagram illustrating an example informative product screen that is displayed on the product list display screen.

For example, the presenter 240 presents, to the user terminal 300, the aforementioned product list display screen 500 illustrated in FIG. 6. When the user moves the mouse cursor over any one of the pieces of product information (within the display region of those pieces of information) on the list display screen 500 through the mouse operation, the presenter 240 in cooperation with the control block 230 generates an informative product screen 502 which shows products with different grade (in this case, a higher grade) from that of the attended product (in this case, "company A, 32V type ABC") that is pointed by a mouse cursor 501 as illustrated in FIG. 7, and presents the generated informative product screen to the user terminal 300. That is, products that are, for example, higher grade than the product (the attended product) upon a mouseover operation to any one of the products are presented on the informative product screen 502.

That is, the presenter 240 causes the searcher 231 to search the products under the second search condition generated by the second generator 235 of the control block 230, generates the informative product screen 502 based on the obtained second search result, and presents the informative product screen to the user.

Note that the informative product screen 502 in FIG. 7 illustrates a case in which the group of informative products with higher grade than that of the attended product is searched. The presenter 240 may generate, for example, an informative product screen 503 illustrated in FIG. 8, and present, to the user terminal 300, this informative product screen in addition to the aforementioned informative product screen 502. This example informative product screen 503 represents a case in which the group of informative products with lower grade than that of the attended product is searched.

The presenter 240 may present either the informative product screen 502 or the informative product screen 503 to the user terminal 300 in accordance with, for example, a user's purchase tendency. For example, the presenter 240 in cooperation with the control block 230 obtains, from the aforementioned sales performance information 222 in FIG. 5, the user's purchase tendency (for example, a tendency to purchase products of relatively high grade, or a tendency to purchase products of relatively low grade). Subsequently, the presenter 240 generates the informative product screen (either the informative product screen 502 or the informative product screen 503) based on the second search result obtained by the searcher 231 which has searched the product information 221 under the second search condition that corresponds to the purchase tendency, and presents the informative product screen to the user.

In addition, instead of displaying either the informative product screen 502 or the informative product screen 503 as discussed above, the presenter 240 may generate an informative product screen 504 illustrated in FIG. 9 after performing searching for both of the higher grade products and the lower grade products, and present the informative product screen to the user terminal 300. This informative product screen 504 represents a case in which the group of informative products with higher grade than that of the attended product is listed together with the group of informative products with lower grade than that of the attended product.

Note that the number of informative products displayed on the aforementioned informative product screens 502 to 504 is, for example, limited to a predetermined number. This is because to avoid cutting of the list display screen 500 beyond the necessity. Note that although an initial value is set for the predetermined number, the predetermined number may be changeable by the user as needed. In addition, when the number of searched informative products exceeds the predetermined number, the presenter 240 generates, based on a predetermined cost calculation, the informative product screens 502 to 504 (in the case of the informative product screen 504, up to the predetermined number of informative products with higher grade and up to the predetermined number of informative products with lower grade are respectively displayed) which respectively list up to the predetermined number of informative products in the order of higher cost values.

The aforementioned CPU 401, the NIC 404 and the like can function as the presenter 240.

(Operation of Sales Server)

Figure 10:
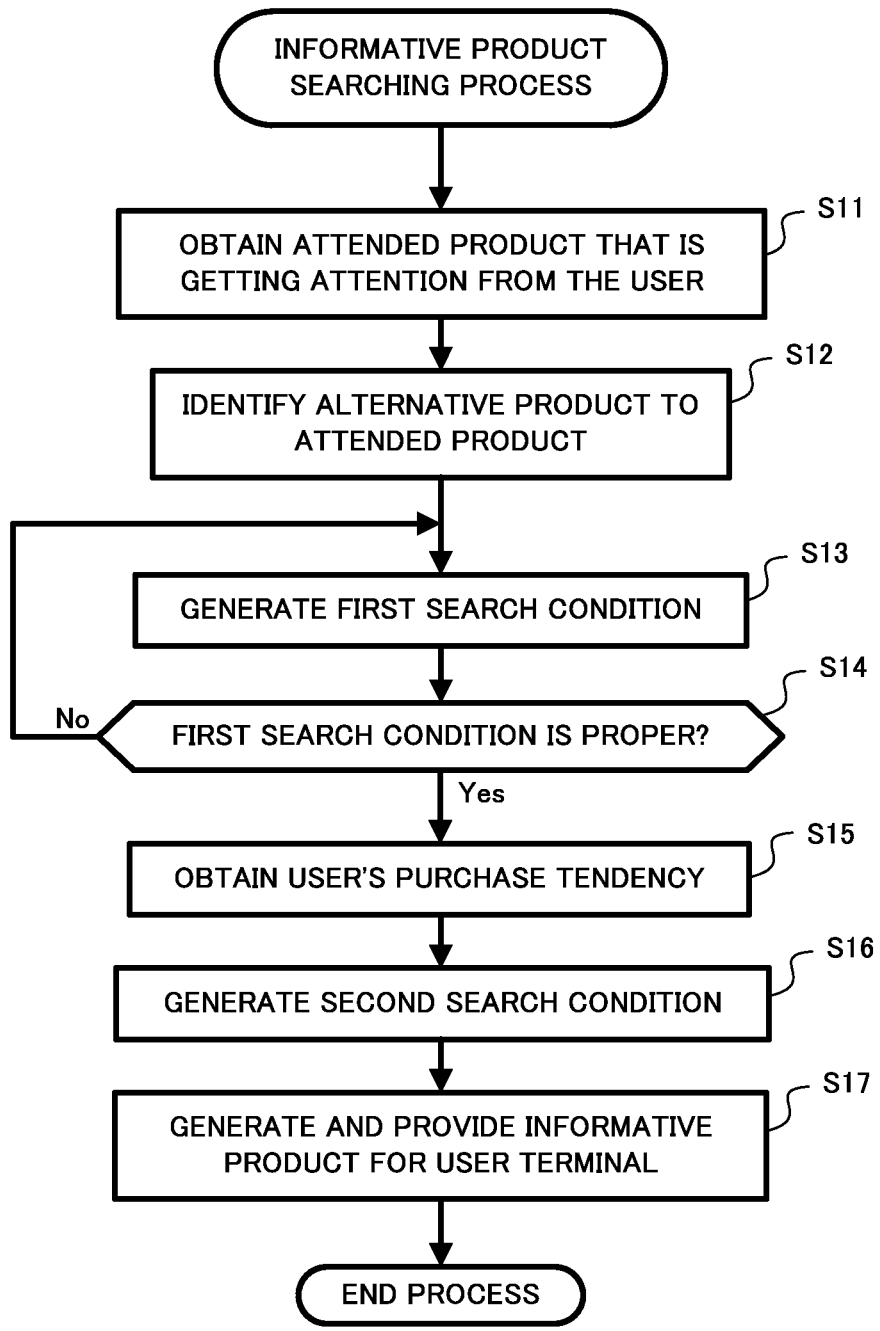
FIG. 10 is a flowchart for explaining an informative-product searching process according to the embodiment.

Hereinafter, an operation of the sales server 200 employing the aforementioned structure will be described with reference to the figures. FIG. 10 is a flowchart illustrating the flow of an informative product searching process executed by the sales server 200. This informative product searching process starts when the attended product that is getting the user's attention is obtained. Note that, it is assumed that the user terminal 300 is displaying, for example, the aforementioned product list display screen 500 as illustrated in FIG. 6, and the user has moved the mouse cursor over any one of the pieces of product information (within the display region of those pieces of information) through the mouse operation.

First, the sales server 200 obtains (step S11) the attended product that is getting attention from the user.

That is, when the position of the mouse cursor in accordance with the user's mouse operation overlaps any one of the pieces of product information (within the display region of the information) in the aforementioned list display screen 500 in FIG. 6, the control block 230 (the identifier 232) determines that this product is the attended product.

The sales server 200 identifies (step S12) the alternative product to the attended product.

That is, the control block 230 (the identifier 232) identifies the alternative product to the attended product in accordance with the sales performance information containing the sales process and the sales price. For example, the identifier 232 extracts, from the aforementioned sales performance information 222 illustrated in FIG. 5, a product having either the sales product ID 222*a* or the reference product ID 222*e* consistent with the product ID (the aforementioned product ID 221*a* in FIG. 4) of the attended product. That is, the identifier extracts the products that have been referred through the sales process of the attended product, and conversely, extracts the products referred for the attended product through the sales process. In addition, the identifier 232 identifies, among the extracted products, the product (for example, the product having a price difference that is within a predetermined range) having the similar sales price to the sales price of the attended product as the alternative product to the attended product.

The sales server 200 generates (step S13) the first search condition.

That is, the control block 230 (the first generator 233) generates the first search condition expected to obtain the search result that contains the attended product and the alternative products. For example, the first generator 233 generates the first search condition based on a common category name to the attended product and the alternative products, a common keyword, and a term that commonly appears in the product description. Note that when the attended product is obtained based on the previous search condition, the first generator 233 generates the first search condition that further contains the previous search condition.

The sales server 200 determines (step S14) whether or not the first search condition is proper.

That is, the control block 230 (the verifier 234) verifies the properness of the aforementioned search condition that is generated in the step S13. For example, the verifier 234 causes the searcher 231 to search the aforementioned product information 221 in FIG. 4 under the generated first search condition, and verifies, based on the obtained first search result, whether or not the first search condition is proper. More specifically, when the appearing rank of the attended product and that of the alternative product in the obtained first search result are higher than the predetermined threshold rank, the verifier 234 then determines that the generated first search condition is proper.

Note that this verification scheme of the first search condition performed by the verifier 234 is merely an example, and the properness of the first search condition may be verified through other verification schemes. When, for example, the search condition is constructed by the combination of multiple sub-conditions, the properness of the first search condition may be verified based on whether or not the average rank (the median rank) of the attended product and that of the alternative product are as high as possible, and the combination can accomplish the ranking as narrow as possible.

When determining (step S14) that the first search condition is not proper, the sales server 200 returns the process to the step S13. That is, the sales server 200 generates another first search condition again in the step S13.

Conversely, when determining (step S14; YES) that the first search condition is proper, the sales server 200 obtains (step S15) the user's purchase tendency. That is, the control block 230 obtains, from the aforementioned sales performance information 222 in FIG. 5, the user's purchase tendency (for example, a tendency to purchase products with relatively high grade, or a tendency to purchase products with relatively low grade).

The sales server 200 generates (step S16) the second search condition.

That is, the control block 230 (the second generator 235) generates the second search condition which is the first search condition that has been verified as proper and with the added or replaced condition of the price range different from that of the attended product. That is, the second generator 235 generates the second search condition to search the group of informative products having a difference grade from that of the attended product.

For example, the second generator 235 searches, in the aforementioned sales performance information 222 in FIG. 5, the sales performance for the attended product under the condition containing recent sales performance (for example, the sales date 222*c* from the present time to the predetermined past time), and excluding the sales performance for a discount price (for example, excluding the sales performance that is out of a standard deviation measured around a mean value), and counts the sales price 222d of the obtained records to determine the price range of the attended product. Note that the purpose of counting the recent sales price 222d is to exclude old products (products of previous model and the like).

Subsequently, the second generator 235 generates, in accordance with the aforementioned user's purchase tendency obtained in the step S15, the second search condition which is the first search condition with the added or replaced condition of the price range that is higher or lower than the determined price range of the obtained attended product by a predetermined percentage.

For example, when the purchase tendency of the user to purchase products with relatively high grade is obtained in the aforementioned step S15, the second generator 235 generates the second search condition which is the first search condition with the added (or replaced) condition of the price range that is higher than the price range of the attended product by a predetermined percentage. Conversely, when the purchase tendency of the user to purchase products with relatively low grade is obtained in the aforementioned step S15, the second generator 235 generates the second search condition which is the first search condition with the added condition of the price range that is lower than the price range of the attended product by a predetermined percentage.

The sales server 200 generates and presents (step S17) the informative product screen to the user terminal 300.

That is, the presenter 240 in cooperation with the control block 230 generates the informative product screen based on the second search result obtained under the second search condition generated in the aforementioned step S16, and presents the generated informative product screen to the user.

For example, the presenter 240 generates the informative product screen 502 which shows products with different grade (in this case, a higher grade) from that of the attended product (in this case, "company A, 32V type ABC") that is pointed by the mouse cursor 501 as illustrated in aforementioned FIG. 7, and presents the generated informative product screen to the user terminal 300. That is, products that are, for example, higher grade than the product (the attended product) upon a mouseover operation to any one of the products are presented through the informative product screen 502.

Note that although the informative product screen 502 in FIG. 7 represents a case in which the group of informative products with higher grade than that of the attended product is searched, the presenter may generate the informative product screen 503 in aforementioned FIG. 8, and may present this informative product screen to the user terminal 300. This example informative product screen 503 represents a case in which the group of informative products with lower grade than that of the attended product is searched.

In addition, instead of displaying either the informative product screen 502 or the informative product screen 503 as discussed above, the presenter 240 may generate the informative product screen 504 illustrated in aforementioned FIG. 9 after performing searching for both of the higher grade products and the lower grade products, and may present the generated informative product screen to the user terminal 300. This informative product screen 504 represents a case in which the group of informative products with higher grade than that of the attended product is listed together with the group of informative products with lower grade than that of the attended product.

According to such informative sales assisting process, the second search condition which is the first search condition that has been verified as proper and with the added (or replaced) condition of the price range that is different from the price range of the attended product is generated, and the second search result obtained under this second search condition is presented to the user (the user terminal 300).

That is, the group of products having the higher or lower grade is obtained after the group of products belonging to the grade of the attended product based on sales performance information 222. Hence, the group of products that is a higher or lower grade can be searched in accordance with the user's impression (conforming the practical needs). In addition, the group of products that is the higher or lower grade can be searched even if the way of reaching the attended product is not based on searching.

Consequently, products having the grade that is different from that of the attended product can be appropriately searched.

Other Embodiments

In the aforementioned embodiment, the explanation was given of a case in which the attended product that is getting attention from the user is obtained based on the position of the mouse cursor, but the scheme of obtaining the attended product is optional and is not limited to this scheme. For example, the attended product may be obtained in response to a clear instruction (for example, a right click on the mouse, a movement of a selection cursor, and the like) from the user.

In the aforementioned embodiment, the explanation was given of a case in which the informative product screen 502 is displayed in a manner superimposed on the list display screen as illustrated in FIG. 7, but the display scheme of the informative products (the products having the different grade from that of the attended product) is optional and is not limited to this scheme. For example, the informative products may be embedded and displayed in the list display screen.

In the aforementioned embodiment, the explanation was given of an example that is the sales site for products, but the present disclosure is applicable to the sales site and the like for selling services like insurance other than the aforementioned products.

INDUSTRIAL APPLICABILITY

As described above, according to the present disclosure, it becomes possible to provide the searching device, the searching method, the non-transitory recording medium, and the program that enable an appropriate search for the product having the different grade from that of the attended product.

REFERENCE SIGNS LIST

100 Sales system
200 Sales server
210 Acceptor
220 Database
230 Control block
231 Searcher
232 Identifier
233 First generator 234 Verifier
235 Second generator
240 Presenter
300 User terminal
400 Information processing device
401 CPU
402 ROM
403 RAM
404 NIC
405 Image processor
406 Sound processor
407 DVD-ROM drive
408 Interface
409 External memory
410 Controller
411 Monitor
412 Speaker
900 Internet

The invention claimed is:

1. A searching device comprising:
at least one memory configured to store program code; and
at least one processor configured to read the program code and operate as instructed by the program code, the program code including:
searcher code configured to cause the at least one processor to search for a plurality of products based on a search condition;
identifier code configured to cause the at least one processor to identify an attended product that is determined based on a position of a cursor on a list of the plurality of products displayed on a user terminal, and a first alternative product to the attended product among the plurality of products;
first generator code configured to cause the at least one processor to generate a first search condition based on at least one of a category, a keyword, and a term that is common between the attended product and the first alternative product, and obtain a first search result including the attended product and the first alternative product among the plurality of products based on the first search condition;
second generator code configured to cause the at least one processor to, based on the first search result including the attended product and the first alternative product, generate a second search condition by modifying the first search condition to search for a second alternative product having a price range different from a price range of the attended product, and obtain a second search result based on the second search condition; and
presenter code configured to cause the at least one processor to display, on a first interface of the user terminal, the attended product among the puerility of products,
wherein the presenter code is further configured to cause the at least one processor to display the second alternative product on a second interface of the user terminal while displaying the attended product on the first interface.

2. The searching device according to claim 1, wherein the identifier code is configured to cause the at least one processor to identify the first alternative product to the attended based on sales performance information including a plurality of sales prices associated with the plurality of products.

3. The searching device according to claim 1, wherein the second generator code is further configured to cause the at least one processor to obtain the price range of the attended product based on a sales price of the attended product in sales performance information excluding a discounted price of the attended product, the sales performance information being information on a sales performance of the attended product from a present time to a predetermined past time, and generate the second search condition to search for the second alternative product that is higher or lower than the price range of the attended product by a predetermined percentage.

4. The searching device according to claim 1, wherein the presenter code is further configured to perform a predetermined cost calculation with respect to a plurality of second alternative products included in the second search result, and display, up to the predetermined number of products in an order of cost values.

5. The searching device according to claim 1, wherein the identifier code is further configured to cause the at least one processor to identify the alternative product in accordance with sales performance information so as to extract the alternative product from either a sales product or a reference product that matches the attended product.

6. The searching device according to claim 1, wherein the presenter code is further configured to cause the at least one processor to present, as the second search result, either informative product screen including products that are higher grade than the attended product or the informative product screen including products that are lower grade than the attended product to the user terminal in accordance with a user's purchase tendency, and
wherein the tendency being obtained from sales performance information in which a user of the user terminal has the tendency to purchase products of relatively higher grade than a grade of the attended product or the tendency to purchase products of relatively lower grade than the grade of the attended product.

7. A searching method performed by at least one processor, the method comprising:
searching for a plurality of products based on a search condition;
identifying an attended product that is determined based on a position of a cursor on a list of the plurality of products displayed on a user terminal and a first alternative product to the attended product among the plurality of products;
generating a first search condition based on at least one of a category, a keyword, and term that is common between the attended product and the first alternative product, and obtaining a first search result including the attended product and the first alternative product among the plurality of products based on the first search condition;
based on the first search result including the attended product and the first alternative product, generating a second search condition by modifying the first search condition to search for a second alternative product having a price range different from a price range of the attended product, and obtaining a second search result based on the second search condition; and
displaying, on a first interface of a user terminal, the attended product among the plurality of products,
wherein the displaying further comprises displaying the second alternative product on a second interface of the user terminal while displaying the attended product on the first interface.

8. The searching method according to claim 7, further comprising identifying the first alternative product to the attended product based on sales performance information including a plurality of sales prices associated with the plurality of products.

9. The searching method according to claim 7, further comprising obtaining a price range of the attended product based on a sales price of the attended product in sales performance information excluding a discounted price of the attended product, the sales performance information being information on the sales performance of the attended product from a present time to a predetermined past time, and generating the second search condition to search for the second alternative product that is higher or lower than the price range of the attended product by a predetermined percentage.

10. A non-transitory recording medium having stored therein a program for causing a computer to:
search for a plurality of products based on a search condition;
identify an attended product that is determined based on a position of a cursor on a list of the plurality of products displayed on a user terminal and a first alternative product to the attended product among the plurality of products;
generate a first search condition based on at least one of a category, a keyword, and a term that is common between the attended product and the first alternative product among the plurality of products based on the first search condition;
based on the first search result including the attended product and the first alternative product, generate a second search condition by modifying the first search condition to search for a second alternative product having a price range different from a price range of the attended product, and obtain a second search result based on the second search condition; and
display, on a first interface of a user terminal, the attended product among the plurality of products,
wherein the displaying is further comprises displaying the second alternative product on a second interface of the user terminal while displaying the attended product on the first interface.

11. The non-transitory recording medium according to claim 10, wherein the identifying further comprises identifying the first alternative product to the attended product based on sales performance information including a plurality of sales prices associated with the plurality of products.

12. The non-transitory recording medium according to claim 10, wherein the generating the second search condition further comprises generating the price range of the attended product based on a sales price of the attended product in sales performance information excluding a discounted price of the attended product, the sales performance information being information on the sales performance of the attended product from a present time to a predetermined past time, and generating the second search condition to search for the second alternative product that is higher or lower than the price range of the attended product by a predetermined percentage.

13. A searching device comprising:
at least one memory configured to store program code; and
at least one processor configured to read the program code and operate as instructed by the program code, the program code including:
search code configured to cause the at least one processor to search, when a search condition is given, a group of products based on the given search condition;
identifier code configured to cause the at least one processor to identify an alternative product to an attended product that is determined based on a position of a cursor in a user terminal;
first generator code configured to cause the at least one processor to generate a first search condition to obtain a first search result including the attended product and the alternative product;
second generator code configured to cause the at least one processor to, based on the first search result including the attended product and the first alternative product, generate a second search condition by modifying the first search condition to search for a second alternative product having a price range different from a price range of the attended product, and obtain a second search result based on the second search condition; and
presenter code configured to cause the at least one processor to present, to the user, a second search result that is obtained by the search performed with the generated second condition, the second search result being either informative product screen including products that are higher grade than the attended product or the informative product screen including products that are lower grade than the attended product to the user terminal in accordance with, a user's purchase tendency,
wherein the presenter code is further configured to cause the at least one processor to present, based on the second search result, a product that is in the price range different from the price range of the attended product while the presenter code is presenting the attended product, and
wherein the tendency being obtained from sales performance information in which a user of the user terminal has the tendency to purchase products of relatively higher grade than a grade of the attended product or the tendency to purchase products of relatively lower grade than the grade of the attended product.

* * * * *